United States Patent
Hartwig-Biglau et al.

(10) Patent No.: US 10,702,913 B2
(45) Date of Patent: Jul. 7, 2020

(54) WELDING AUXILIARY JOINING PART, MATRIXES FOR PLACING THE WELDING AUXILIARY JOINING PART, AND CONNECTION AND PRODUCTION METHODS FOR THE WELDING AUXILIARY JOINING PART AND THE MATRIXES

(71) Applicants: BÖLLHOFF VERBINDUNGSTECHNIK GMBH, Bielefeld (DE); VOLKSWAGEN AKTIENGESELLSCHAFT, Wolfsburg (DE)

(72) Inventors: Sergej Hartwig-Biglau, Löhne (DE); Torsten Draht, Schloss Holte-Stukenbrock (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 633 days.

(21) Appl. No.: 15/039,798

(22) PCT Filed: Nov. 21, 2014

(86) PCT No.: PCT/EP2014/075328
§ 371 (c)(1),
(2) Date: May 26, 2016

(87) PCT Pub. No.: WO2015/078794
PCT Pub. Date: Jun. 4, 2015

(65) Prior Publication Data
US 2017/0001235 A1    Jan. 5, 2017

(30) Foreign Application Priority Data
Nov. 29, 2013    (DE) .................. 10 2013 020 082

(51) Int. Cl.
*B23K 11/00*    (2006.01)
*B21J 15/36*    (2006.01)
(Continued)

(52) U.S. Cl.
CPC ............. *B21J 15/36* (2013.01); *B21J 15/025* (2013.01); *B23K 11/0066* (2013.01); *F16B 5/08* (2013.01)

(58) Field of Classification Search
CPC ....... B23K 11/00; B23K 11/02; B23K 11/002; B23K 11/004; B23K 11/06; B23K 11/064; B23K 11/066
(Continued)

(56) References Cited

U.S. PATENT DOCUMENTS 3,342,533 A    9/1967    Scherzer et al.
3,944,777 A *  3/1976    Porat .................. B23K 11/0046
                                                        174/260

(Continued)

FOREIGN PATENT DOCUMENTS

DE    1099663 B     2/1961
DE    1577602 A1    1/1970
(Continued)

OTHER PUBLICATIONS

English translation of the International Preliminary Report on Patentability for PCT/EP2014/075328 dated Jun. 9, 2016, 20 pages.
(Continued)

*Primary Examiner* — Dana Ross
*Assistant Examiner* — Ayub A Maye
(74) *Attorney, Agent, or Firm* — Reising Ethington P.C.

(57) ABSTRACT

The disclosure is related to various connecting methods for a welding auxiliary joining part having a head and a rounded tip for setting in at least one first component having a die as
(Continued)

counter-bearing, which has a concave recess with an inner wall having at least in sub-areas an arc shape and having a matrix radius MR in the range from 1.0 mm≤MR≤60 mm, for preparing a subsequent welding method. The geometry of the welding auxiliary joining part and the die meet the following condition:

$$0.001 \leq \frac{SR}{MR} \leq 0.1,$$

in particular $$0.002 \leq \frac{SR}{MR} \leq 0.08,$$

wherein SR designates a tip radius of the rounded tip of the welding auxiliary joining part.

21 Claims, 8 Drawing Sheets

(51) Int. Cl.
    *B21J 15/02* (2006.01)
    *F16B 5/08* (2006.01)
(58) Field of Classification Search
    USPC ... 219/78.01, 78.16, 83, 84, 86.1, 86.26, 93, 219/98, 119
    See application file for complete search history.

(56) References Cited

U.S. PATENT DOCUMENTS

| | | | | |
|---|---|---|---|---|
| 5,304,769 | A | * | 4/1994 | Ikegami ............ B23K 35/0205 219/119 |
| 5,739,496 | A | * | 4/1998 | Asakura ............... B23K 11/115 219/119 |
| 5,739,498 | A | | 4/1998 | Sunamoto et al. |
| 6,684,479 | B2 | * | 2/2004 | Wang ................... B21D 39/031 219/151 |
| 6,694,597 | B2 | * | 2/2004 | Wang ..................... B21J 15/025 29/525.05 |
| 6,769,595 | B2 | * | 8/2004 | Stol ....................... B21J 15/027 228/112.1 |
| 7,267,736 | B2 | * | 9/2007 | Hou ................... B23K 11/0066 156/272.2 |
| 2008/0081499 | A1 | | 4/2008 | Sumi et al. |
| 2009/0011269 | A1 | | 1/2009 | Urushihara et al. |
| 2013/0327755 | A1 | | 12/2013 | Weiss |
| 2015/0144602 | A1 | | 5/2015 | Draht et al. |
| 2015/0258624 | A1 | | 9/2015 | Draht et al. |

FOREIGN PATENT DOCUMENTS

| | | | |
|---|---|---|---|
| DE | 4237361 A1 | 5/1994 | |
| DE | 10015713 A1 | 10/2001 | |
| DE | 10060390 A1 | 6/2002 | |
| DE | 102007036416 A1 | 2/2009 | |
| DE | 102006002238 B4 | 6/2009 | |
| DE | 102004025492 A1 | 8/2009 | |
| DE | 102010013089 A1 | 9/2011 | |
| DE | 102010020569 A1 | 11/2011 | |
| DE | 102012010870 A1 | 12/2013 | |
| DE | 102012018866 A1 | 3/2014 | |
| EP | 1078701 A2 | 2/2001 | |
| EP | 2606993 A1 | 6/2013 | |
| EP | 2631022 A1 | 8/2013 | |
| GB | 1019698 A * | 2/1966 | ............ B23K 11/14 |
| JP | H09150815 | 6/1997 | |
| JP | 2007118047 A | 5/2007 | |
| JP | 2008080394 | 4/2008 | |
| WO | WO2012095103 A1 | 7/2012 | |
| WO | WO2014210278 A1 | 12/2014 | |

OTHER PUBLICATIONS

CuCr1Zr, Deutsches Kupferinstitut, Aug. 23, 2006, pp. 10, XP055193999.
Schweißen von Kupfer und Kupferlegierungen, Deutsches Kupferinstitut, Oct. 22, 2010, pp. 54, XP055194002.
Written Opinion & International Search Report for PCT/EP2014/075328 dated Jun. 30, 2015, 20 pages.
EP Office Action for EP Application No. 14802063.9 dated Oct. 19, 2018 (6 pages).

* cited by examiner

Figure 1:
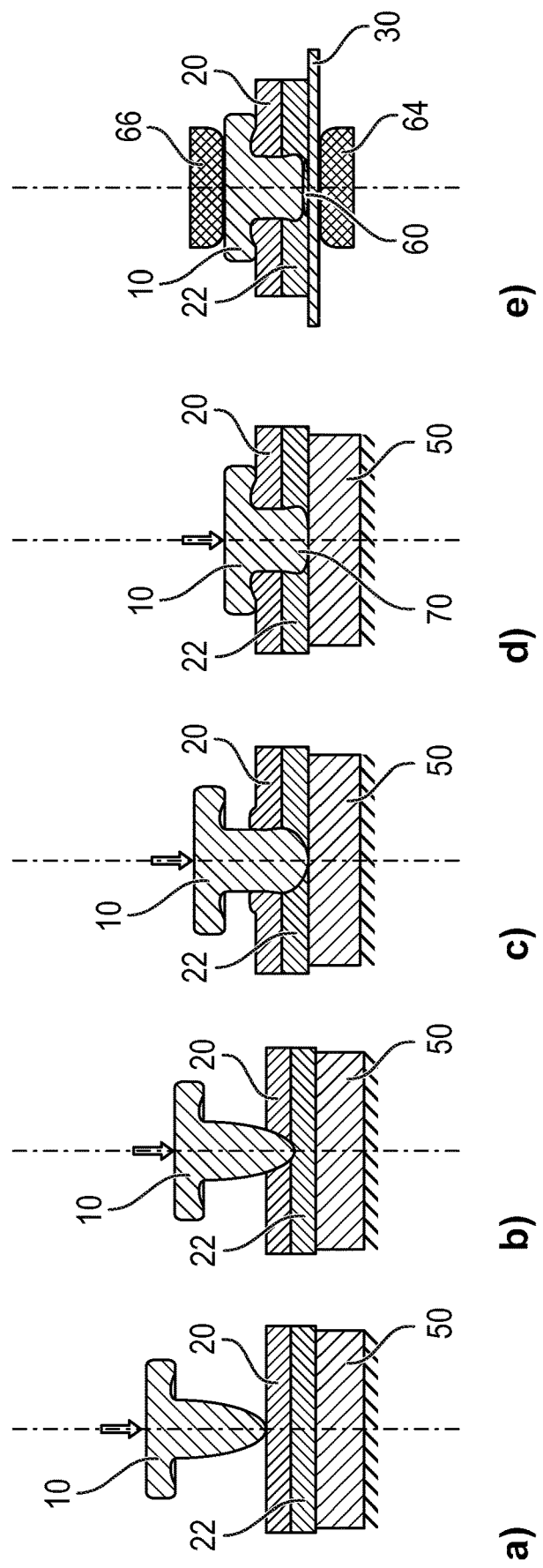

FIG. 1 State of the Art

WELDING AUXILIARY JOINING PART, MATRIXES FOR PLACING THE WELDING AUXILIARY JOINING PART, AND CONNECTION AND PRODUCTION METHODS FOR THE WELDING AUXILIARY JOINING PART AND THE MATRIXES

1. TECHNICAL FIELD

The present disclosure is related to a welding auxiliary joining part for being set into at least a first component in combination with a die and for being subsequently welded to at least a second component, a die for setting the welding auxiliary joining part, a connection method for the welding auxiliary joining part in combination with the die as a counter bearing as well as a production method for each of the welding auxiliary joining part and the die.

2. BACKGROUND

In the prior art, different welding auxiliary joining parts are known. Frequently, the shape of the known welding auxiliary joining parts varies depending on the setting method and the subsequent welding method and depending on the materials to be joined to each other.

In DE 10 2010 020 569, a welding auxiliary joining part is pressed into a component made of non-weldable material. This welding auxiliary joining part is flattened on both sides to facilitate in this way the abutting of a welding electrode. When the welding auxiliary joining part is pressed or punched in, a generated material slug must be removed, which causes an avoidable procedural effort. Due to this procedure, the combination of the setting process of the welding auxiliary joining part with the subsequent welding process is also made more difficult.

A similar fastening of a welding auxiliary joining part is disclosed in DE 100 15 713 A1. Here, a rivet is inserted having a T-shape or a double-T-shape after the setting. The here set welding auxiliary joining parts provide advantageous contact points for, for example, resistance welding, but require at the same time a complex fastening of the welding auxiliary joining part and removing of a slug during the setting method.

In DE 100 60 390 A1, a known punch riveting method takes place, wherein the punch and the die also act as welding electrodes. The electric current flowing through the rivet serves on the one hand for the heating of the components to support the joining process. On the other hand, the electric current is increased so much that also a welded connection between the rivet and the component made of weldable material is producible.

In DE 10 2004 025 492, also a known setting method is used in which the punch and the die form electrodes for resistance welding at the same time. As a first component made of a non-weldable material is to be joined to a second component made of a weldable material, the welding starts at the earliest upon contact between the welding auxiliary joining part and the second component. Since the welding auxiliary joining part is pressed comparatively slowly into the components, the welding takes place under combined electrical and mechanical loads on the components. Thus, a combined setting-welding method is used, at which a connection between the first and the second component is already established solely due to the setting method. This requires that the components to be connected are always commonly positioned between the punch and the die. Thus, for example, an equipping of the first component with the welding auxiliary joining part prior to the welding process is impossible. Further, the welding auxiliary joining parts according to the method described herein have different cutting and tip geometries. Depending on the cutting or tip geometry as well as the number of tips being present at a welding auxiliary joining part, different welding zones evolve. The different welding zones influence the nature and extent of the welding connection between the welding auxiliary joining part and the second component.

DE 10 2007 036 416 describes a welding auxiliary joining part in the manner of a nail. By means of the tip of the welding auxiliary joining part it can be set into an aluminum sheet, so that the tip of the welding auxiliary joining part can be subsequently used as welding projection in resistance welding. The tip, however, has the disadvantage that first, only an area selectively limited to the tip of the welding auxiliary joining part is flown through by an electric welding current to form a welding zone. Only when the tip is piecewise melting, the weld zone and thus the connection area between the welding auxiliary joining part and the second component gets larger or increases. This procedure is time-consuming and has a negative impact on the overall time of the connection method.

In DE 10 2012 018 866, bolts are being set into an at least first component made of a poorly-weldable material by means of combined mechanical and thermal loads. Thereby, the thermal loads, generated for example by a current flowing in the bolt, cause the setting process. In combination or subsequently thereto, a welding of the bolt to a second component consisting of weldable material occurs. In preparation of the welding procedure, the tip of the bolt is deformed at the anvil.

DE 10 2012 010 870 describes a two-staged connection method by means of a bolt. First, the bolt is set into a first component and compressed at an anvil or a die. The deformation of the bolt tip related thereto is to prepare the subsequent welding of the deformed bolt to a component made of a weldable material. Thereby, the bolt tip is deformed at differently-shaped dies to produce a welding head adapted to fit the subsequent welding process. In this context, it has been proven to be disadvantageous that, during the setting of the bolt into the first component, the material of the first component is not completely displaced from the deformed tip portion of the bolt. This can lead to negative effects in the subsequent welding procedure as the material of the first component is poorly weldable and hinders the production of a welded joint.

It is therefore an object of at least certain implementations of the present invention to optimize the upstream setting method of a welding auxiliary joining part compared to the prior art, in order to reduce the procedural shortcomings during the subsequent welding.

3. SUMMARY

The above object may be solved by a welding auxiliary joining part, a die, by connection methods for a welding auxiliary joining part as well as by a production method for a welding auxiliary joining part and by a production method for a die. Preferred embodiments, further developments and modifications will become apparent from the following description, the accompanying drawings and the appending claims.

The inventive welding auxiliary joining part to be set into at least a first component made of poorly-weldable material in combination with a die and to be subsequently welded to at least a second component made of weldable material comprises the following features: a head and a rounded tip formed arc-shaped around a point on a longitudinal axis of the welding auxiliary joining part, wherein the rounded tip has a tip radius $SR_1$ in the range of 1 mm≤$SR_1$≤8 mm.

The welding auxiliary joining part consists of weldable material. Furthermore, it is designed in such a way that at least a first component of poorly-weldable material is equipped with this welding auxiliary joining part. This provides the basis for ensuring that the first component is connectable with a second component of weldable material via the inserted welding auxiliary joining part by means of welding. Preferably, resistance welding, light arc welding or a similar known welding process is used for the welding connection. The structure of the welding auxiliary joining part is preferably designed such that, first, a sufficient material displacement behavior is realizable in the material of the first component by the welding auxiliary joining part. By means of the material displacement behavior and in particular the design of the tip of the welding auxiliary joining part it is assured that the material of the first component is largely, preferably completely, displaced from the tip of the welding auxiliary joining part, which has been deformed at a die, during the setting process. In this way, a welding projection or welding head results from the setting process, which will be described in greater detail below, and this welding projection or welding head is capable of realizing, during the welding to the second component, a satisfactory weld nugget because of an only negligible interference from residual material of the first component. For this purpose, the inventive welding auxiliary joining part comprises the above-mentioned tip radius $SR_1$. This tip radius will be chosen in adaptation with the die used for the setting procedure.

Another inventive welding auxiliary joining part to be set into at least a first component of poorly-weldable material in combination with a die and to be subsequently welded to at least a second component of weldable material comprises the following features: a head and a rounded tip formed arc-shaped around a point on a longitudinal axis of the welding auxiliary joining part, wherein the rounded tip has a tip radius $SR_2$ in the range of 0.1 mm≤$SR_2$≤2.5 mm. This additional inventive welding auxiliary joining part is qualitatively constructed in the same way as described already above. To be adapted to certain preferred joining tasks, the dimension of the rounded tip of the welding auxiliary joining part is designed in a different way. This design enables the preferred combination of the rounded tip with a conical portion arranged between the rounded tip and the head of the welding auxiliary joining part. Additionally, the here-mentioned conical portion preferably widens in the direction of the head of the welding auxiliary joining part.

The welding auxiliary joining part comprises a shank, wherein an outer surface of the rounded tip leads directly into a lateral surface of the shank. Depending on the thickness of the components to be joined, the welding auxiliary joining part comprises a certain length of said shank. The length of the shank is variable in order to realize a sufficient penetration of the at least one first component. At the same time, it is also preferable that the welding auxiliary joining part is used without a shank and that the rounded tip or the rounded tip comprising a cone-shaped intermediate section directly merges into the head of the welding auxiliary joining part. Therefore, the shank preferably has a length in the range of 0 mm<$l_s$<15 mm between the bottom side of the head and the side of the rounded tip or of the cone-shaped portion facing the head of the shank.

According to various embodiments, the welding auxiliary joining part thus comprises a rounded tip, the arc-shaped profile of which extends over the entire diameter of the shank of the welding auxiliary joining part. If no shank is provided, the tip forming arc leads directly into the head of the preferred welding auxiliary joining part. If the welding auxiliary joining part is preferably equipped with the cone-shaped section mentioned above, the tapering portion of the cone-shaped section is heading towards the joining direction and, in this way, forms the tip of the welding auxiliary joining part. This tip has been rounded in accordance with the above-mentioned ranges of the tip radius $SR_1$ or $SR_2$. Thus, the inventively preferred welding auxiliary joining parts have no sharp tip in the joining direction. By means of the preferred rounded tip geometry of the welding auxiliary joining part, a controlled displacement of the material of the at least one first component out of the later welding area is realized, which is situated below the welding auxiliary joining part, i.e. in the setting direction of the welding auxiliary joining part. Once the rounded tip of the welding auxiliary joining part encounters a die, whose shape is matched to the preferred embodiment of the welding auxiliary joining part, the material of the at least one first component is transported radially outwardly into a preferred material displacement gap between the welding auxiliary joining part and the die. In this way, the later provided welding head or welding projection, caused by the deformation of the welding auxiliary joining part on the die, is largely, preferably completely, freed from an annoying material rest of the material of the first component.

According to a further embodiment of the welding auxiliary joining part described above, the cone-shaped section comprises a tip angle SW in the range of 35°≤SW≤80° between a central axis and a conical surface. This tip angle SW and/or the tip radius SR has been chosen in accordance with the die (see below) used for the setting method so that a minimum gap between the surface of the welding auxiliary joining part and the surface of the die does not fall below 10°, provided that the deforming of the welding auxiliary joining part has not yet begun. This material displacement gap is defined by the die geometry and the tip geometry, which are both facing away from each other. By means of its minimum dimension it ensures, even before the welding auxiliary joining part is deformed, that, during deformation, a sufficiently wide gap between the welding auxiliary joining part and the die is provided for transporting the material.

The present disclosure also includes a die for setting the above-described welding auxiliary joining part. This die has the following characteristics: a concave recess whose inner wall is at least partially, preferably completely, formed arc-shaped comprising a die radius MR in the range of 1 mm≤MR≤60 mm or 10 mm≤MR≤60 mm or 1 mm≤MR≤8 mm. According to a further embodiment, the die radius MR includes at one point of a central axis of the concave recess an origin in combination with a continuously arc-shaped recess, or the die radius comprises an origin with respect to the at least one sub-area at one point of the central axis or at least on a straight line running parallel to the central axis of the concave recess. According to another embodiment of the inventive die, the concave recess comprises a die radius MR in the range of 1.0 mm≤MR≤8 mm, wherein the concave recess opens in a circumferential and convex section. From this preferred geometric design of the die it follows that it is shaped concavely in its central section adjacent to the symmetry axis, while it opens in said circumferential convex-shaped section in axial direction and radially outwardly against the setting direction. Furthermore, it is preferable that the die has at its lowest point a plateau or other non-arc-shaped shape. Such recesses or curvilinear patterns preferably extend concentrically around the central axis along a radial inner wall of the die. This design of the die in adaptation with the preferred geometry of the welding auxiliary joining part also realizes a radially outwardly occurring displacement of the material of the first component as well as an advantageous formation of a welding head or a welding projection for preparing the welding to the second component still to be run or carried out. It is in this connection that the concave section of the die is formed arc-shaped and that it comprises an outer radius $MR_a$ in the range of 10 mm≤$MR_a$≤50 mm.

The present disclosure also includes various connection methods for a welding auxiliary joining part with a head and a rounded tip, in particular a welding auxiliary joining part according to one of the above-described embodiments, for being set into at least one first component by using a die as a counter-bearing/abutment. With regard to the connection methods, different preferred geometries of the welding auxiliary joining part are combined with specially matched geometries of the die in order to realize an optimal setting of the welding auxiliary joining part into the first component of poorly-weldable material with a simultaneous formation of an advantageous welding head for subsequent welding. In a first connection method, the die used as abutment includes a concave recess with an inner wall being arc-shaped in at least a partial section and comprising a die radius MR in the range of 1.0 mm≤MR≤60 mm. Based thereon, the inventive setting method comprises the following step: setting the welding auxiliary joining part in at least one first component of poorly-weldable material and against the die, wherein a material displacement gap is provided between a tip geometry of the welding auxiliary joining part and a die geometry, if the following conditions are fulfilled:

$$0.002 \le \frac{SR}{MR} \le 0.08,$$

in particular $$0.001 \le \frac{SR}{MR} \le 0.1,$$

wherein SR denotes a tip radius of the rounded tip of the welding auxiliary joining part. The above-listed ratios between the tip radius SR of the welding auxiliary joining part and the die radius MR of the recess of the die are selected such that the above-mentioned material displacement gap between the tip geometry of the welding auxiliary joining part and the die geometry of the die is sufficiently large to ensure a material displacement of the material of the first component out of the area below the tip of the welding auxiliary joining part. To this end, it is also preferable that the tip radius SR and the die radius MR have a proportion of MR≥2·SR.

It is further preferred that the inventive connection method is supported by the die radius MR being chosen from the range of 20 mm≤MR≤40 mm and the tip radius SR being chosen from the range of 0.1 mm≤SR≤1.5 mm.

According to a further embodiment of the connection method, the welding auxiliary joining part comprises a conical section located between the rounded tip and the head. This geometric design of the welding auxiliary joining part supports the production of a reliable connection if the conical section preferably widens towards the head of the welding auxiliary joining part and comprises a tip angle SW between a central axis of the conical section and a cone surface selected from the range of 35°≤SW≤80°. This design of the welding auxiliary joining part particularly supports the interaction with the die geometry matched to the welding auxiliary joining part.

The present disclosure comprises a further connection method for a welding auxiliary joining part with a head and a rounded tip, in particular a welding auxiliary joining part as has been already described above. This connection method is used for setting the welding auxiliary joining part into at least one first component of poorly-weldable material by means of a die as counter-bearing/abutment which comprises a concave recess having an at least in a partial section arc-shaped inner wall with a die radius MR in the range of 1.0 mm≤MR≤60 mm. The connection method comprises the following step: setting the welding auxiliary joining part in at least one first component and against the die, wherein a material displacement gap is provided between a tip geometry of the welding auxiliary joining part and a die geometry if the following conditions are fulfilled:

$$0.01 \le \frac{SR}{MR} \le 1,$$

in particular $$0.1 \le \frac{SR}{MR} \le 0.6,$$

wherein SR denotes a tip radius of the rounded tip of the welding auxiliary joining part.

In comparison to the connection methods described above, the die used herein comprises a smaller die radius MR. Thus, other ratios of the tip radius SR to die radius MR arise, ensuring the advantageous material displacement gap between the tip geometry and the die geometry. According to a further embodiment of this connection method, the die comprises the concave recess with the die radius MR in the range of 1.5 mm≤MR≤5 mm, wherein the concave recess opens in a circumferential convex section, in particular with an outer die radius $MR_a$ in the range of 15 mm≤$MR_a$≤40 mm. By means of this design of the die, a pit-like depression is produced into which the welding auxiliary joining part is set. The resulting material displacement of the at least one first component as well as the deformation of the welding auxiliary joining part is advantageous for the formation of a welding pimple/hump for the later initialization of the welding.

Further, the tip radius SR and the die radius MR have the ratio of MR≥2·SR. Furthermore, it is preferred that the die radius MR is selected from a range 1.5 mm≤MR≤5 mm and that the die radius SR is selected from 0.1 mm≤SR≤1.5 mm. According to a further embodiment of the connection method, the welding auxiliary joining part preferably comprises a cone-shaped portion located between the rounded tip and the head of the welding auxiliary joining part, which widens towards the head and which includes a tip angle SW in the range of 35°≤SW≤80° between a central axis of the cone-shaped portion and an outer surface. The procedural benefits associated with this preferred geometry have been collectively explained above and apply here in the same way.

The present disclosure comprises another connection method for a welding auxiliary joining part having a head and a rounded tip, in particular one of the welding auxiliary joining parts described above, to be set into at least one first component of poorly weldable material having a die as abutment and comprising a concave recess with an at least partially arc-shaped inner wall with a die radius MR in the range of 1.0 mm≤MR≤60 mm. This step of the connection method serves as preparation of a subsequent welding procedure. The connection method comprises the following steps: setting of the welding auxiliary joining part into the at least one first component and against the die wherein a material displacement gap is provided between a tip geometry of the welding auxiliary joining part and a die geometry if the following conditions are fulfilled:

$$0.01 \leq \frac{SR}{MR} \leq 0.5,$$

in particular $$0.03 \leq \frac{SR}{MR} \leq 0.3,$$

wherein SR denotes a tip radius of the rounded tip of the welding auxiliary joining part. The connection method is preferably directed to the production of a connection using a welding auxiliary joining part, the rounded tip of which extends over the entire diameter of a shank of the welding auxiliary joining part or whose rounded tip merges directly into the head of the welding auxiliary joining part. Due to this geometric configuration of the tip geometry of the welding auxiliary joining part and the die, an interaction between the concave, preferably continuously arc-shaped, recess of the die and the arc-shaped shape of the tip of the welding auxiliary joining part, which form the material displacement gap between them, results. If the above-mentioned ratios between the tip radius SR and the die radius MR are met, the non-weldable material of the first component is displaced radially outwardly, so that it is only negligible, preferably not at all, present in the area of the subsequent welding projection of the deformed welding auxiliary joining part. Thus, the ratios of the tip radius SR and the die radius MR mentioned herein ensure a reliable radial displacement of material by the material displacement gap as well as the formation of an advantageous welding projection or welding head, to be able to produce the welded connection to the second component of weldable material.

The tip radius SR and the die radius MR have a ratio of MR≥2·SR. It is further preferred that the die radius MR is selected from the range of 20 mm≤MR≤40 mm and that the tip radius SR is selected from the range 1 mm≤SR≤1.5 mm.

The present disclosure further comprises a connection method for a welding auxiliary joining part comprising a head and a tip to be set into at least one first component of poorly-weldable material having a die as abutment/counter-bearing which includes a recess with a die angle MW between a central axis of the recess and an inner wall of the recess to prepare a subsequent welding process, said connection method comprising the step of: setting the welding auxiliary joining part into the at least one first component and against the die, wherein a material displacement gap between the welding auxiliary joining part and the die is provided when the following conditions are fulfilled:

$$0.4 \leq \frac{SW_1}{MW} \leq 1.0,$$

in particular $$0.6 \leq \frac{SW}{MW_1} \leq 0.8,$$

wherein SW denotes a tip angle of the tip of the welding auxiliary joining part which has been measured between the central axis and the outer surface of the welding auxiliary joining part.

According to the connection method described herein, a welding auxiliary joining part with no rounded tip is set into a first component. The die acting as counter-bearing/abutment has an angled recess in contrast to the arc-shaped recesses described above. Correspondingly, it is especially the advantageous tuning of the tip angle SW and the die angle MW which produces the advantageous material displacement gap supporting on the one hand the radial material removal of the first component and on the other hand an advantageous development of a welding head or a welding projection by deformation of the welding auxiliary joining part.

In this connection, it is preferred that the die has an angled recess with the die angle MW in the range of 70°≤MW≤90°. According to another embodiment of the present disclosure, the tip angle SW and the die angle MW meet the following ratio: MW−SW≥10°. It is also preferred that the tip angle SW is selected from the range of 35°≤SW≤80°.

It is further preferred that all inventive connection methods described above comprise the further step of welding the first component comprising a welding auxiliary joining part to a second component of weldable material. Furthermore, it is preferred for all above-described connection methods that, the welding auxiliary joining part is, when being set into the at least one first component, accelerated to a speed in the range of 1 m/s≤v≤40 m/s, further preferred in the range of 10 m/s≤v≤40 m/s, and even more preferred in the range of 20 m/s≤v≤40 m/s, and also preferred to at least 30 m/s. The here preferably used high setting speed for the welding auxiliary joining part has the advantage that, compared to the prior art, the time required for the setting procedure is minimized. Furthermore, the high kinetic energy of the welding auxiliary joining part caused by the speed ensures a reliable deformation of the welding auxiliary joining part at the die. In this way, it is ensured that, during the deformation of the welding auxiliary joining part at the die, the welding projection or welding head supporting the welding procedures is formed and that the material of the first component is displaced radially outwardly from the tip portion of the welding auxiliary joining part. Also when it comes to the connection methods described above, the welding auxiliary joining part preferably comprises a shank as it has been already described above.

The present disclosure also includes a production method for a welding auxiliary joining part, in particular a welding auxiliary joining part as it has been described above, comprising: cold-forming of the welding auxiliary joining part which comprises a head and a rounded tip.

Additionally, the present disclosure includes a production method for a die, in particular a die as it has been described above, comprising: forming and finishing of an arc-shaped recess with a die radius MR about a point on a central axis of the arc-shaped recess in the range of 1.0 mm≤MR≤60 mm.

4. DETAILED DESCRIPTION OF THE DRAWINGS

Figure 2:
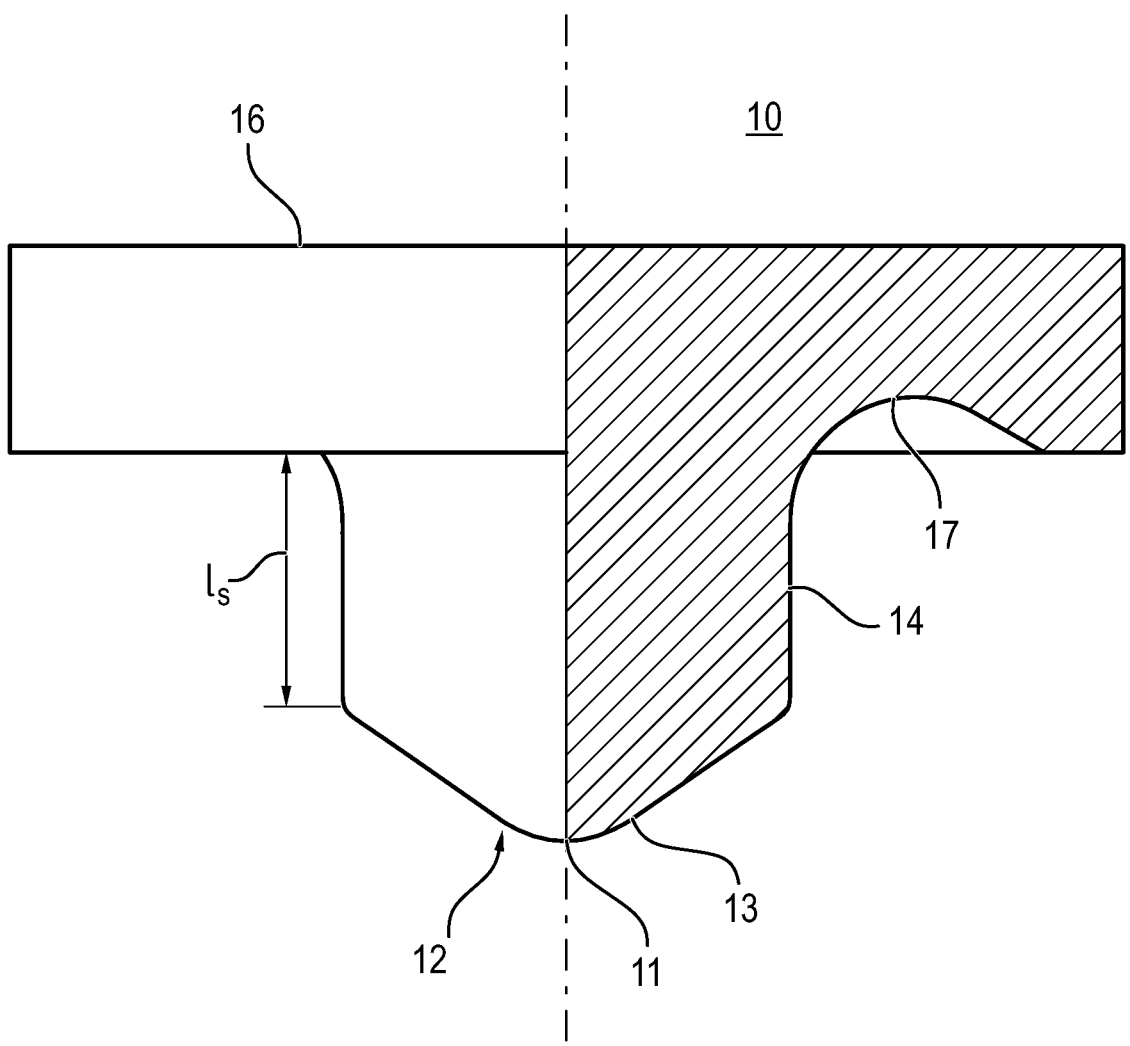
Figure 3:
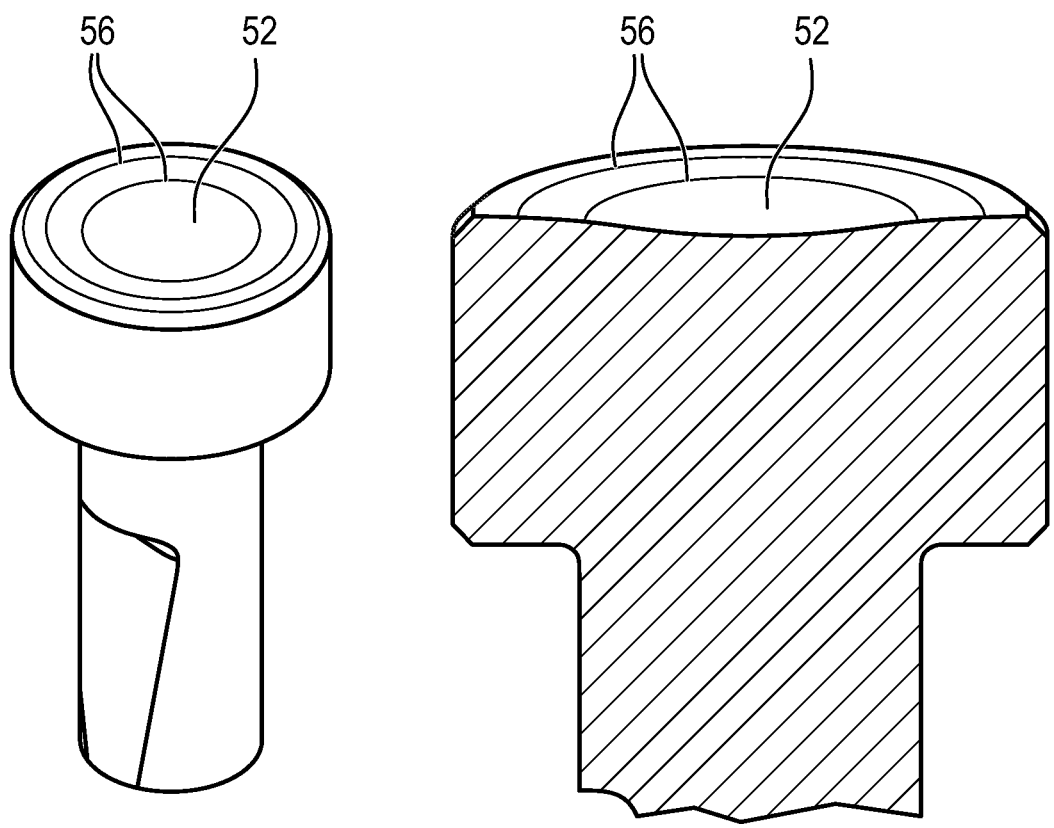
Figure 4:
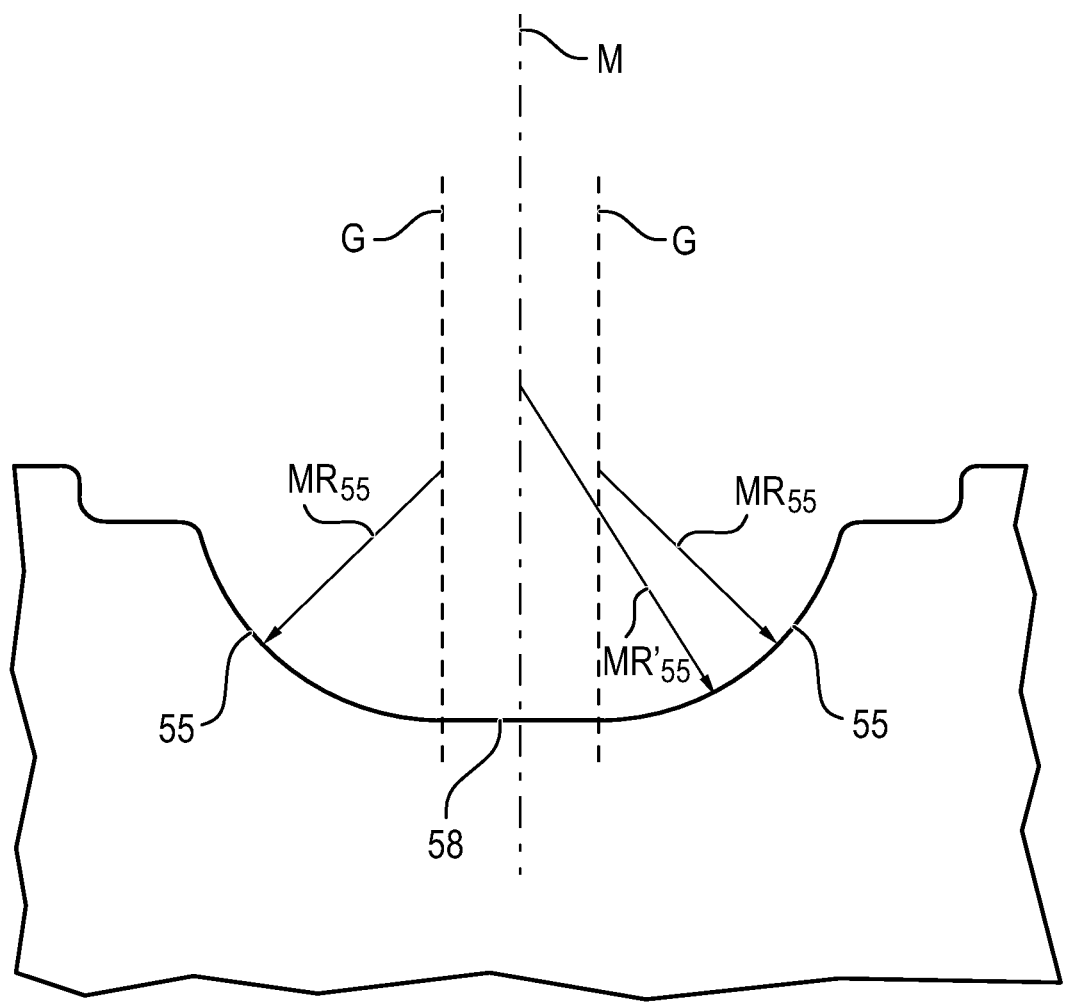
Figure 5:
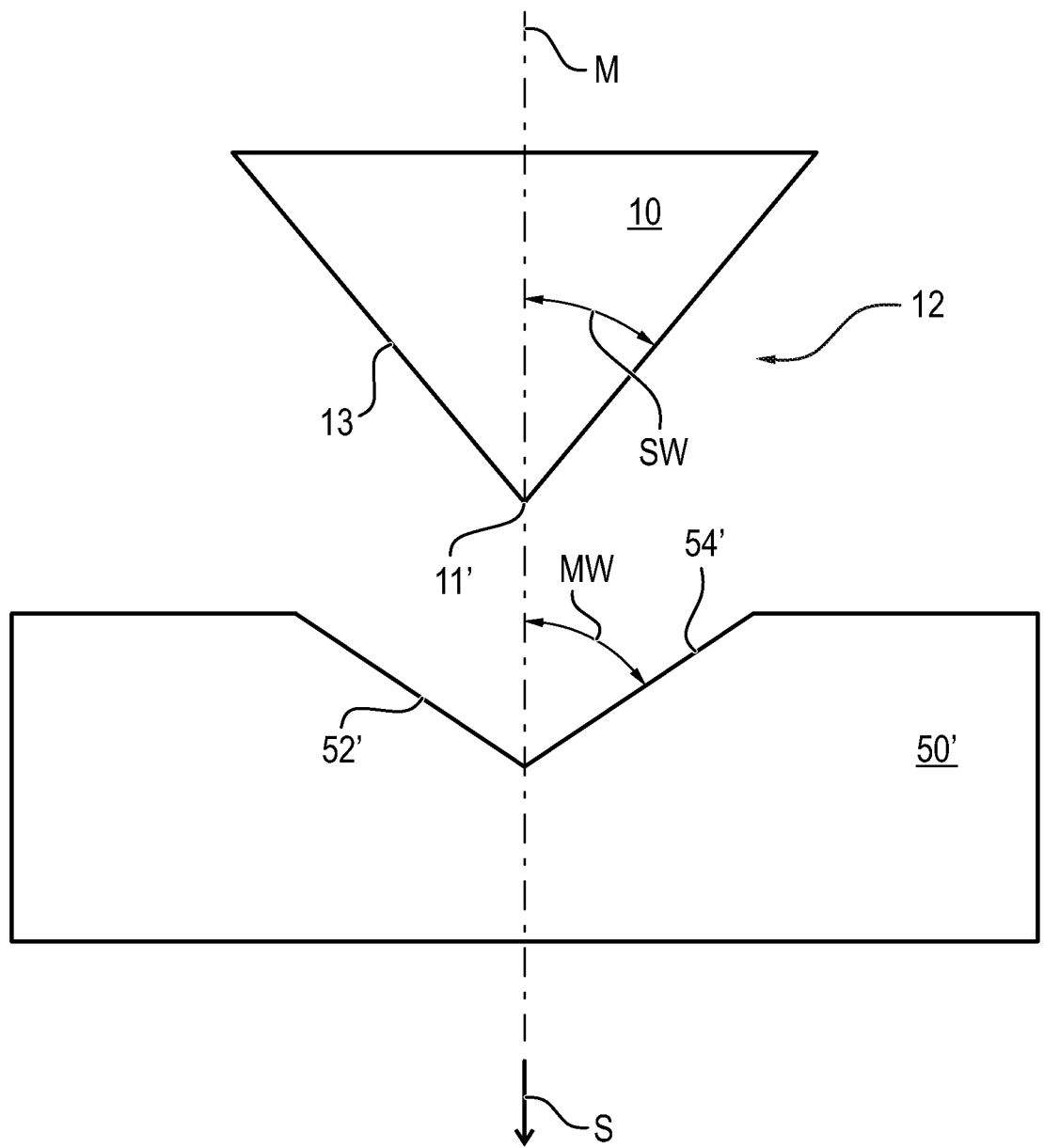
Figure 6:
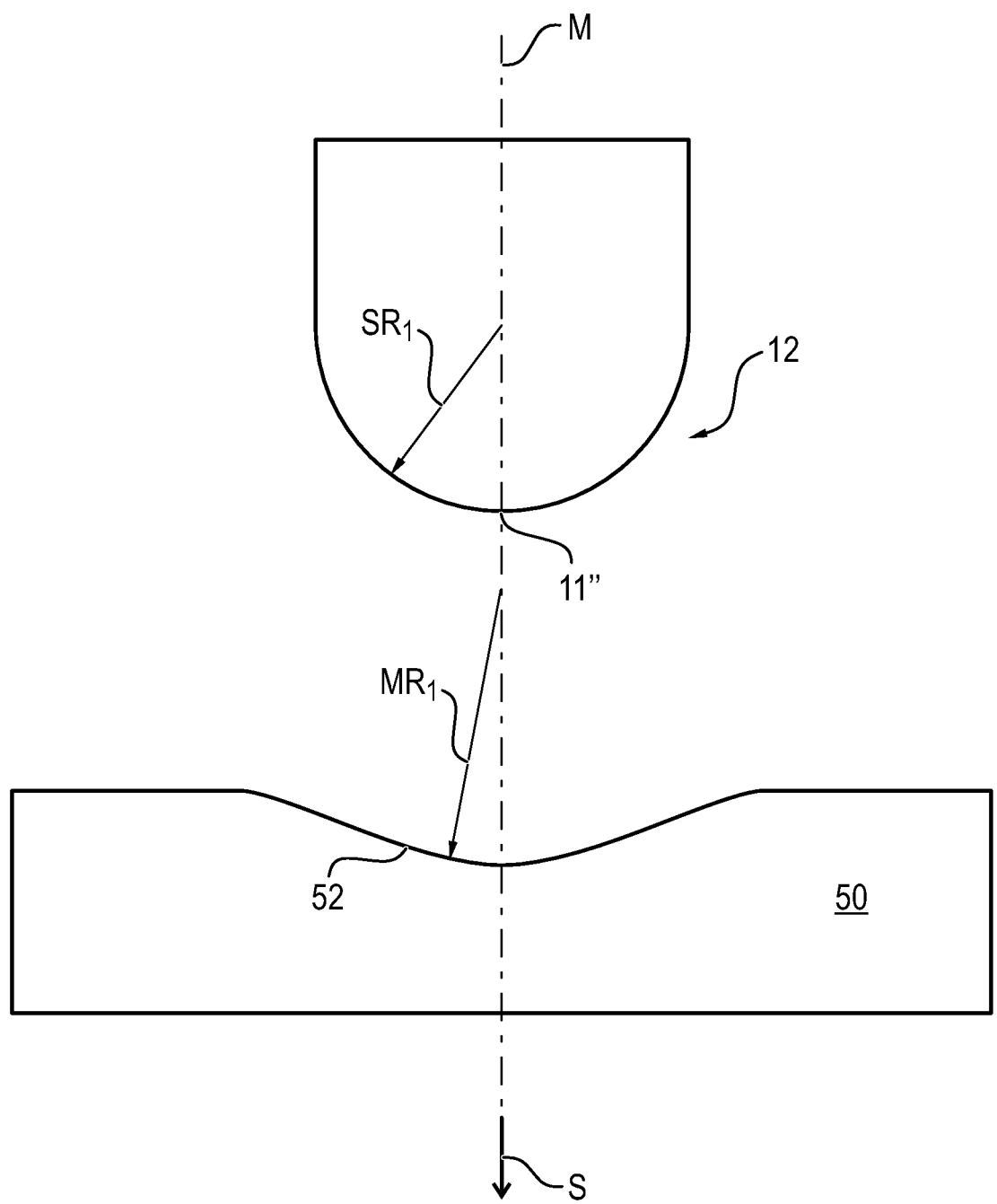
Figure 7:
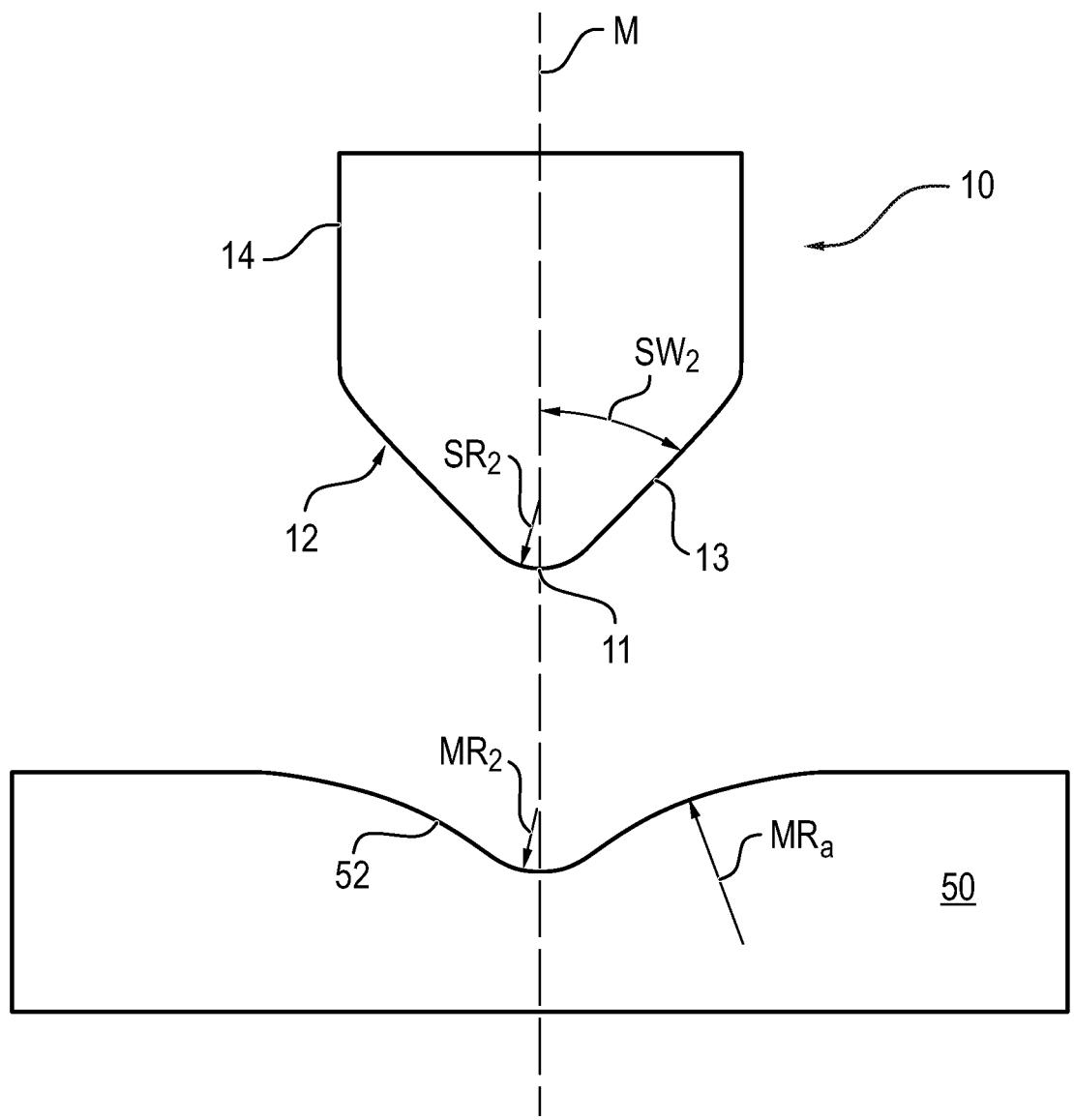
Figure 8:
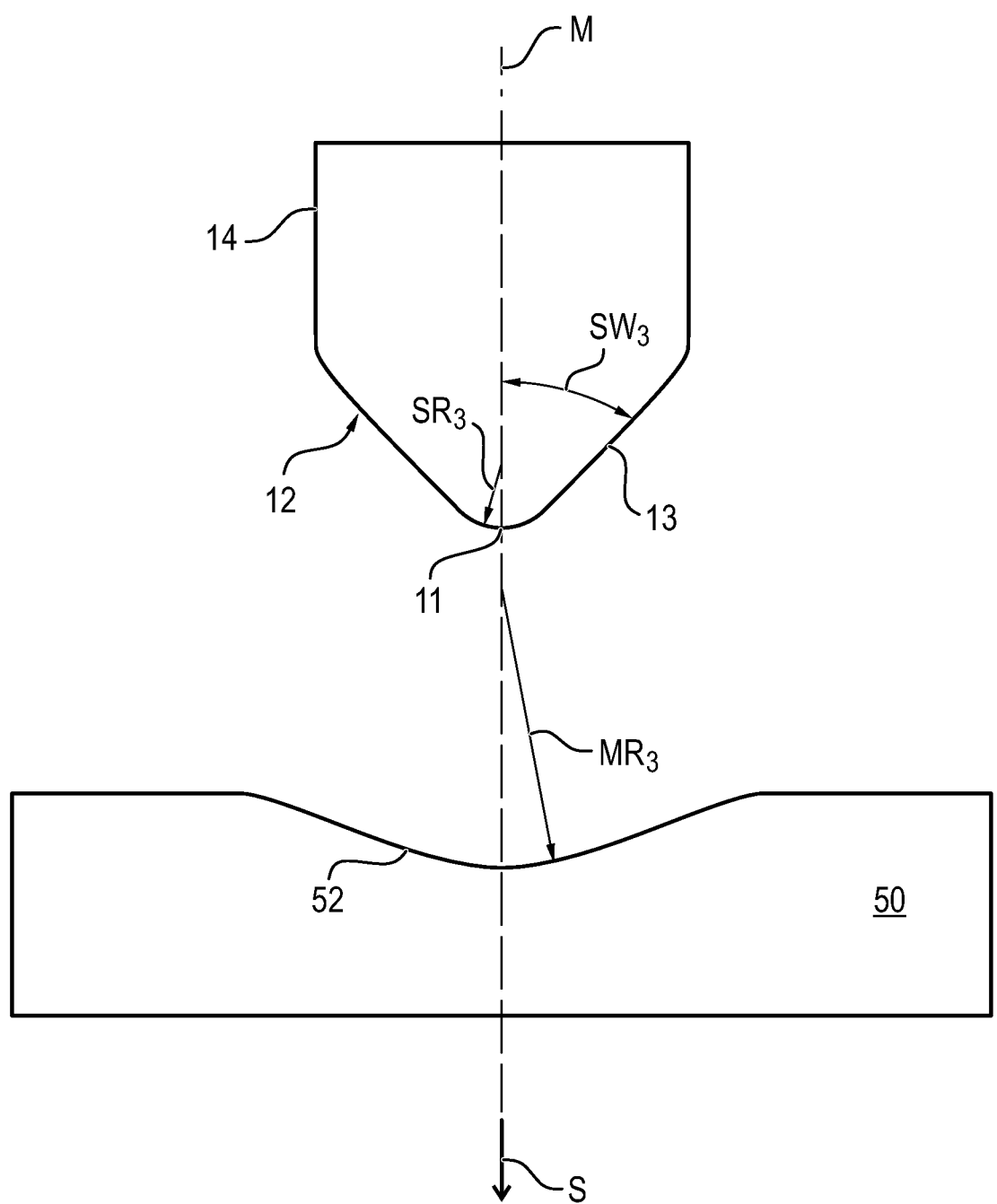

The present disclosure is explained in more detail with reference to the accompanying drawings. There are shown:

FIG. 1 the basic structure of the here-shown connection method, consisting of the setting method and welding according to DE 10 2012 010 870 from the prior art, FIG. 2 is a schematic side view and a partially sectional view of an embodiment of the inventive welding auxiliary joining part, FIG. 3 is a side perspective view and a sectional view of a die, FIG. 4 is a schematic vertical section through an embodiment of a die in parallel to the central axis of the die, FIG. 5 shows a first preferred combination of geometries of the welding auxiliary joining part and the die for the setting process, FIG. 6 is a further combination of a geometry of the welding auxiliary joining part with a geometry of the die for the setting process of the welding auxiliary joining part, FIG. 7 shows a further combination of a geometry of the welding auxiliary joining part with an adapted geometry because the template for the setting method, and FIG. 8 shows another combination of the geometry of the welding auxiliary joining part with an adapted geometry because the die for the setting process of the welding auxiliary joining part.

5. DETAILED DESCRIPTION

The present disclosure serves for connecting at least one first component 20, 22 made of a non- or poorly-weldable material, further referred to as poorly-weldable material, with at least one second component 30 made of a weldable material by welding. To this purpose, a welding auxiliary joining part 10 consisting of weldable material is initially set at least into the at least one first component 20, 22. After the setting procedure of the welding auxiliary joining part 10 has been completed, the first component 20 is welded to the second component 30 by means of the set welding auxiliary joining part 10. Thereby, a welded connection between the welding auxiliary joining part 10 and the second component 30 is produced. A method like this has been described in DE 10 2012 010 870, that is referred to for supplementary technical information.

As an example, FIG. 1 shows FIG. 16 from DE 10 2012 010 870. Therein, the welding auxiliary joining part 10 is first set into both of the first two components 20, 22 made of a poorly-weldable material. A die 50, which will be discussed in greater detail below, acts as a counter-bearing/abutment for the setting procedure of the welding auxiliary joining part 10. The welding auxiliary joining part 10 is formed as a nail. The shape of the welding auxiliary joining part 10 is also explained below in greater detail.

During the substeps a, b, c and d according to FIG. 1, the welding auxiliary joining part 10 is first set substantially rotation-free into the not pre-punched first components 20, 22 by means of a punch (not shown) with a force F. Thereby, a material displacement takes place in the first components 20, 22 by means of the welding auxiliary joining part 10 without component material being punched out during the setting procedure. In depiction d, it can be seen that the welding auxiliary joining part 10 is deformed at the die 50. The deformation in the area of the tip of the welding auxiliary joining part forms a welding head 70, a welding projection or generally a suitable welding contact area to be welded to the second component 30 in accordance with depiction e. The welding takes place by means of known electric welding procedures, for example resistance welding, whereby the welding electrodes 64, 66 are in contact with the second component 30 and the welding auxiliary joining part 10. For that reason, an electric welding current is flowing between the welding electrodes 64, 66 producing a welding spot 60 and, after cooling, a welded connection at the interface between the welding auxiliary joining part 10 and the second component 30. The size, shape, speed as well as the type of the forming of the welding spot 60 is, among others, dependent on the welding contact area of the welding auxiliary joining part 10, which has been deformed during setting, to the second component 30. A suitable production and configuration of the welding contact area is carried out by the deformation of the welding auxiliary joining part 10 at the die 50, wherein the shape of a tip portion 13 of the welding auxiliary joining part 10 is matched to a shape of the die 50 in the impact region of the welding auxiliary joining part 10 during setting.

The materials of the components to be connected 20 and 30 are not mutually compatible for welding, so that they are welded indirectly via the welding auxiliary joining part 10. The weldable materials include steel and high-tensile steels such as 22MnB5 (CEV=0.5), B27 (CEV=0.54), 32MnCrB6 (CEV=0.6), of which, for example, framework structures in vehicle manufacturing are produced. Non- or poorly-weldable materials include materials that can only be poorly or not at all welded to other components without constructive aids. This also includes weldable materials, which, however, have in their material combination no or only a small welding compatibility to the material of a component to be connected to. This means that the generally weldable materials cannot be welded to each other or only in a difficult or poor way. These materials include, for example, plastics, fiber-reinforced plastics, aluminum, cast iron or other iron alloys as well as steels, such as spring steels with a CEV>0.8.

The setting of the welding auxiliary joining part 10 is carried out by the above-mentioned punch, which is moved by a hydraulic, electromagnetic, electric, pneumatic or gas-powered drive. According to a further embodiment, the welding auxiliary joining part is, depending on the joining task, driven in by means of a pulse-like force which accelerates the welding auxiliary joining part 10 up to a speed in the range of 1 m/s to 40 m/s, preferably 1 m/s up to and including 5 m/s, further preferred in the range of 10 m/s≤v≤40 m/s, even more preferred in the range of 20 m/s≤v≤40 m/s, and also preferred to at least 30 m/s. Such a driving in or setting process has been described in DE 10 2006 002 238, that is referred to at this point. After the setting process has been completed, the at least one component 20, 22 of non- or poorly-weldable material is provided with the welding auxiliary joining part 10, which provides the evenly or protrudingly arranged welding contact area, hereafter called welding head. Additionally, a head 12 of the welding auxiliary joining part protrudes from the component 20, 22 or abuts it. Since the at least one first component 20, 22 and the welding auxiliary joining part 10 are reliably connected to each other, it is preferred to transport this combination and to weld it elsewhere. In this way, the subsequent welding can follow the setting at the same place.

As it has been already mentioned above, the formation of the welding head 70 is inventively achieved by a selective matching of the shape of the welding auxiliary joining part 10, in particular the shape of a tip portion 12, to a shape of the die 50. A further embodiment of the welding auxiliary joining part 10 is shown in FIG. 2. FIG. 3 shows a side and a sectional view of a preferred die 50. FIG. 4 schematically shows a further preferred geometric design of the die 50, along with the parameters to describe it. FIGS. 5 to 8 depict preferred shaping configurations of the welding auxiliary joining part 10 and the die 50 which have been matched to each other.

FIG. 2 shows a partial sectional view of the preferred welding auxiliary joining part 10 with the tip portion 12, a shank 14 and a head 16. It is generally required that the welding auxiliary joining part 10 is adapted to the joining task and particularly to the material properties of the at least one first component 20. In particular, the welding auxiliary joining part 10 must be harder than the at least one first component 20. In this way it is ensured that a deformation of the welding auxiliary joining part 10 takes place only after the at least one first component 20 has been penetrated. Additionally, it is avoided that the welding auxiliary joining part 10 already expands laterally when penetrating the first component 20. Furthermore, the preferred welding auxiliary joining part 10 comprises a sufficiently high residual ductility to plastically deform without cracks when hitting the die 50. In addition, it has been recognized that, when the strength of the welding auxiliary joining part 10 increases, a higher driving force of the welding auxiliary joining part 10 is required. Thus, the strength of the welding auxiliary joining part has to be in the range of 800 to 1200 N/mm$^2$ when, for example, thin aluminum sheets of 0.8 to 2.5 mm are used. The strengths vary within this range depending on the geometry of the tip of the welding auxiliary joining part 10. In accordance with the material of the welding auxiliary joining part 10, the material of the die 50 is selected from harder ones in order to ensure the deformation of the welding auxiliary joining part 10.

Referring to the illustration of the welding auxiliary joining part 10 in FIG. 2, the head 16 preferably has a diameter of 5 to 12 mm, more preferably 7 to 10 mm, and further preferred of 8 mm. Depending on the joining task to be solved and the stability required for the later connection of the welding auxiliary joining part 10, the height of the head 16 varies in the range of 0.8 to 2 mm, preferably of 1.0 to 1.8 mm. According to a further embodiment, the head is formed planar on its upper side, i.e. opposite to the joining direction S. In this way, a sufficiently large contact area is provided for the driver piston. It is further preferred to equip the head 16 laterally with a cylindrical or a rounded circumferential surface.

Further, the head 16 includes an under-head radial groove 17. This under-head radial groove 17 serves for receiving the material displaced from the at least one first component 20. The material received in the under-head radial groove 17 preferably has, at a shear stress situation, a stabilizing impact on the welding auxiliary joining part 10 already set into the component 20. The under-head radial groove 17 preferably has a height of 0.2 to 0.6 mm and a width of 1.5 to 2.0 mm. In addition, the under-head radial groove preferably runs radially upwardly so that an outer, planar annular surface is formed at the bottom side of the head 16. This annular surface leans on the first component 20 and, by a sufficiently radial width, it avoids a notch effect of the bottom side of the head in the first component 20. Additionally, and preferably after the setting procedure has been completed, the bottom side of the head closes the area of the under-head radial groove anticorrosively, preferably hermetically and without a gap between the bottom side of the head and the component by abutting on the component.

The shank 14 is an optional element of the welding auxiliary joining part. It establishes a connection between the head and the tip portion 12. It is also preferred to directly join the tip portion 12, which preferably is provided with a sharp tip (see FIG. 5), a dome-shaped round tip (see FIG. 6) or a rounded tip (see FIGS. 7 and 8) to the head 16. During the setting process, the shank 14 stabilizes the welding auxiliary joining part 10 when penetrating the first component 20. In addition, the shank is compressed at the die along with the tip portion 12, whereby it expands radially. As the diameter of the shank 14 at the transition between the shank 14 and tip portion 12 is, after compression, larger than the shank diameter at the transition between the shank 14 and the head 16, it forms an undercut which supports the holding of the welding auxiliary joining part within the first component 10. Preferably, the shank has a diameter of 3 to 4 mm. The length of the shank 14 varies in the range of 0 mm<$l_s$≤15 mm, preferably at least 1 mm and further preferred 1 mm≤$l_s$≤6 mm, depending on the thickness of the components 20, 22 to be joined.

The tip portion 12 of the welding auxiliary joining part 10 consists of a tip 11 and an adjoining cone-shaped portion 13. The tip portion 12 has an influence on the displacing of material during penetration of the welding auxiliary joining part 10 into the first component 20. It is preferred to form the tip portion 12 by the above-mentioned tip 11 and the cone-shaped portion 13. This tip 11 is preferably formed sharp or has a rounded shape. According to a further embodiment, the tip portion 12 has a dome shape. In this case, the shank closes with an arc shape in the joining direction, wherein the diameter of the circular arc covers the entire diameter of the shank 14.

The different shapes of the tip portion 12 are illustrated in FIGS. 5 to 8. FIG. 5 shows a sharp tip 11' merging into the cone-shaped portion 13. The sharp tip 11' is characterized by a tip angle SW, which is located between the central axis M and the radial outer circumferential surface of the tip 11' and the cone-shaped portion 13. Therefore, the tip angle SW also describes the shape of the cone-shaped portion 13.

In FIG. 6, the tip portion 12 or the cone-shaped portion 13 are configured with a rounded shape. The rounded tip 11" extends over the entire diameter of the shank 14, similar to a dome. It is also preferred to omit the shank 14 so that the tip portion 12 merges directly into the head 16. The rounded tip 11 of FIG. 6 is described by a tip radius SR. The circular arc comprising the tip radius SR, which forms the rounded dome-shaped tip 11", has its center on the central axis M.

In FIGS. 7 and 8, the tip portion 12 is a combination of the rounded tip 11 and the cone-shaped portion merging into the optional shank 14.

According to a further embodiment of the cone-shaped portion 13, the circumferential surface is formed planar or curvilinear. The bending of the circumferential surface is convex or concave in order to influence the material displacement behavior while penetrating into the first component 20. It is also preferred to equip the cone-shaped portion 13 with a triangular, rectangular or polyhedral base instead of a round base (not shown).

The dies 50 acting as counter-bearings/abutments are formed in adaptation with the preferred welding auxiliary joining parts 10 of FIGS. 5 to 8. The contour of the die has an influence on the formation of the connection between the welding auxiliary joining part 10 and the at least one first component 20. In this regard, it should be noted that the undercut in the shank portion of the welding auxiliary joining part 10 increases with the flattening of the die-contour, i.e. with a decreasing depth of the recess 52 of the die 50. At the same time, the required joining energy increases in order to realize an abutting of the head 16 of the welding auxiliary joining part 10 on the first component 20. With an increasing of the depth of the die-contour of the die 52, the weldability of the welding auxiliary joining part 10, which has been reshaped in the recess 52, increases. Furthermore, a deeper die-contour 52 contributes to a better reproducibility of the formation of the welding spot 60. However, a deeper die-contour has the disadvantage that the welding auxiliary joining part 10 must be correspondingly formed longer.

With respect to the die-contour, i.e. the shape of the recess 52, it has been proven that the selective deep landing of the recess 52 leads to a higher energy-bundling during the subsequent welding. In this way, a more effective initial welding ignition is possible. It is further preferred to provide a minimum of contour radii 56 in the recess 52 in the die 50. By reducing the contour radii, a uniform flow of the displaced joining material is supported. In this way, it is avoided that displaced material jams on the welding head 70. In addition, it is preferably advantageous to select the inner radius of the die as large as possible. Since such a condition results in a decreased slope of the recess 52 of the die 50, a displacement of material is possible with a lower energy consumption.

The die 50 comprises a concave recess 52. The concave recess 52 is constructed in different ways, according to various embodiments of the present invention. According to a first embodiment, the concave recess 52 is formed arc-shaped, as can be seen in FIGS. 6 to 8. A die radius $MR_1$, $MR_2$, $MR_3$, which has its origin on the central axis M of the concave recess 52, defines the preferably continuous, or at least partially continuous arc shape of the concave recess.

According to another embodiment (see FIG. 4), the concave recess 52 comprises, at least in a partial area 55, an arc-shaped, radial inner side 54 or inner wall. The partial areas 55 are also defined by the respective section of the die radius MR, which will be mentioned below, in particular by the die radius $MR_{55}$ of the partial areas 55. The die radius $MR_{55}$ of the partial areas 55 preferably has its origin in a point on the central axis M or on a straight line G running parallel to the central axis M. Preferably, in a vertical sectional view of the concave recess 52 according to FIG. 4, the concave recess 52 comprises two arc-shaped sectional areas 55, which have been arranged oppositely to each other and which have the radius $MR_{55}$ or $MR_{55}'$. According to a non-illustrated spatial view of the die 50 along with the concave recess 52, the straight lines G are lying on a cylindrical surface, which is arranged concentrically around the central axis M.

In FIG. 4, the partial areas 55 are preferably connected to each other by different shapes of the die base 58 which are designable according to the joining task. According to different embodiments, the die base 58 is flat, corrugated, angled, curved or has another shape. It is further preferred to form concentric landings in the radial inner side 54 of the concave recess 52, which, for example, can be perceived as contour radii 56.

In the following, the dies 50 and connection methods are described using the example of a completely or partially continuous arc-shaped concave recess 52, by means of which the at least one first component 22 is connected to the second component 30 via the welding auxiliary joining part 10. In the same way, a die 50 is usable at this point, whose concave recess 52 has arc-shaped partial areas 55 in the vertical sectional view of the die 50. In a first step I, the welding auxiliary joining part 10 is set into the at least one first component 20. Due to the shapes of the tip portion 12 of the welding auxiliary joining part 10 and of the die 50, which have been preferably adapted to each other, a deformation of the welding auxiliary joining part 10 in the welding head 70 takes place (step II). Subsequently, the welding head 70 is welded to the second component 30 (step III).

It has been proven advantageous and economical to produce the welding auxiliary joining part 10 by a cold forming process with the geometric shapes discussed in greater detail below. The used dies 50 (see below) are also formed (step $H_m1$) and finished (step $H_m2$) according to known methods in the geometries discussed below.

The embodiment according to FIG. 4 shows the cone-shaped portion 13 comprising a non-rounded tip 11' which is tapered sharply or pointed. The tip portion 13 includes a tip angle $SW_1$ in the range of $35° \leq SW_1 \leq 80°$, preferably $45° \leq SW_1 \leq 70°$.

It is preferable that the geometries of the welding auxiliary joining part 10 and the die 50 fulfill the following condition. This is because, in this case, both the setting process of the welding auxiliary joining part in the first component 20 and the formation of a welding head 70 suitable for the subsequent welding is supported. These preferred geometry conditions of the welding auxiliary joining part 10 and the die 50 can be defined as follows with reference to the tip angle $SW_1$ and the die angle MW:

$$0.4 \leq \frac{SW_1}{MW} \leq 1,$$

in particular $$0.6 \leq \frac{SW}{MW_1} \leq 0.8,$$

This welding auxiliary joining part 10 with a non-rounded tip 11 is set by means of a die 50' as counter-bearing/abutment which comprises an angled recess 52' in the setting direction S. The recess 52' is formed cone-shaped with a die angle MW between the central axis M and a radial inner side 54' of the recess 52'. The die angle $MW_1$ is selected from the range of $70° \leq MW_1 \leq 90°$.

It is preferred that the tip geometry and the die geometry, which are arranged oppositely to each other during setting, form a material displacement gap between them, through which the material of the at least one first component 20 can be removed radially outwardly. It is understandable that the size of the gap can only be assessed at the time at which the welding auxiliary joining part meets the die, i.e. before the tip portion 12 of the welding auxiliary joining part 10 is deformed at the die 50, as due to the deformation of the welding auxiliary joining part 10 at the die 50, this material displacement gap is exposed to constant change. Such a material displacement gap is formed as long as the difference of the die angle MW and the tip angle $SW_1$ of the welding auxiliary joining part 10 preferably fulfils the following condition: $MW-SW_1 \geq 10°$.

If, preferably, the ratio ranges mentioned above are combined with one or more of the above-mentioned geometric conditions and if the selected conditions are cumulatively fulfilled, further embodiments of the present disclosure arise.

According to a further embodiment shown in FIG. 6, the tip radius $SR_1$ of the dome-shaped welding auxiliary joining part 10 and the die radius $MR_1$ of the concave, preferably arc-shaped, recess 52 of the die 50 fulfill the following proportion:

$$0.01 \leq \frac{SR_1}{MR_1} \leq 0.5,$$

in particular $$0.03 \leq \frac{SR_1}{MR_1} \leq 0.3$$

wherein the die radius $MR_1$ is preferably selected from the range of 1 mm$\leq MR_1 \leq$60 mm. Also in this embodiment, the preferred circular arcs of the tip 11″ of the welding auxiliary joining part 10 and of the concave, preferably arc-shaped, recess 52 of the die 50 are matched to each other in such a way that an advantageous material displacement gap is formed between them even before the deformation of the welding auxiliary joining part 10 at the die 50. The formation of the material displacement gap is preferably supported if the die radius $MR_1$ reaches or exceeds twice the value of the tip radius $SR_1$, i.e. $MR_1 \geq 2 \cdot SR_1$.

According to a further embodiment, the setting result of the welding auxiliary joining part and the shape of the welding head 70 could be further improved. To this end, the die radius $MR_1$ was selected from the range 20 mm$\leq MR_1 \leq$40 mm and the tip radius $SR_1$ was selected from the range 1 mm$\leq SR_1 \leq$1.5 mm.

Another connection method is illustrated with reference to FIG. 7. Before welding, the illustrated preferred welding auxiliary joining part 10 is at first set against the also preferred die shape. The welding auxiliary joining part 10 includes the non-illustrated head 16, the optional shank 14, the cone-shaped tip portion 12 with the tip angle $SW_2$ as well as a rounded tip 11. The rounded tip 11 is defined by the tip radius $SR_2$ wherein the center of the circular arc of the tip 11 is located on the central axis M.

The concave, preferably arc-shaped, recess 52 of the die 50 is at its lowest point defined by the die radius $MR_2$. Again, the center of the circular arc is located on the central axis M.

When setting the welding auxiliary joining part 10 into the at least one first component 20 and against the die 50 shown in FIG. 7, the material displacement gap, which has been also described above, is formed when the following condition is fulfilled:

$$0.01 \leq \frac{SR_2}{MR_1} \leq 1,$$

in particular $$0.1 \leq \frac{SR_2}{MR_1} \leq 0.6.$$

In this context, it is particularly preferred that the concave, preferably arc-shaped, recess 52 of the die 50 comprises the die radius MR in the range of 1.5 mm$\leq MR \leq$5 mm. Furthermore, it can be seen from the preferred embodiment illustrated in FIG. 7 that the concave, preferably arc-shaped, recess 52 of the die 50 opens into a circumferential, convex-shaped portion against the setting direction S. In particular, this circumferential convex portion is defined by an outer die radius $MR_a$ in the range of 15 mm$\leq MR_a \leq$40 mm.

The die shape used preferably herein generates a welding projection which strongly tapers in the joining direction and which comprises a small contact area in the setting direction S. This shape of the welding projection has the advantage that it facilitates the welding initiation, especially with respect to light arc welding and projection welding.

With respect to the material displacement gap also used in this inventive embodiment, it is preferable that the tip radius $SR_2$ and the die radius MR fulfill the following condition: $MR_2 \geq 2 \cdot SR_2$. In this context, it is further preferred that the tip radius $SR_2$ is in the range of 0.1 mm$\leq SR_2 \leq$1.5 mm. It is particularly preferred that the tip radius $SR_2$ in the range of 0.8 mm$\leq SR_2 \leq$1.2 mm is combined with a tip angle $SW_2$ in the range of 35°$\leq SW_2 \leq$80°, preferably 45°$\leq SW_2 \leq$70° and in particular $SW_2$=55°.

FIG. 8 illustrates another alternative connection method in which the welding auxiliary joining part 10 according to FIG. 7 is set against a concave, preferably arc-shaped, die 50 with a die radius $MR_3$ of 1.0 mm$\leq MR_3 \leq$60 mm. The subsequent welding is supported if during the setting process the following geometric specifications are fulfilled with respect to the welding auxiliary joining part 10 and the die recess 52:

$$0.001 \leq \frac{SR_3}{MR_3} \leq 0.1,$$

in particular $$0.002 \leq \frac{SR_3}{MR_3} \leq 0.08.$$

Preferably, the suitable material displacement and formation of a desired welding head 70 is supported when setting the welding auxiliary joining part 10 by the fact that the tip radius $SR_3$ and the die radius $MR_3$ meet the following ratio: $MR_3 \geq 2\ SR_3$. In this context, preferably the die radius $MR_3$ is selected from the range 20 mm$\leq MR_3 \leq$40 mm and the tip radius $SR_3$ is selected from the range 0.1$\leq SR_3 \leq$1.5 mm.

In a further embodiment of the method described herein, the welding auxiliary joining part 10 comprises a cone-shaped portion 12 arranged between the rounded tip 11 and the head 16 of the welding auxiliary joining part. This cone-shaped portion 12 is characterized by a tip angle $SW_3$ in the range of 35°$\leq SW \leq$80°.

Since the die 50 according to FIG. 8 preferably has a larger die radius MR than the die with convex end according to FIG. 7, a larger contact area on the deformed welding auxiliary joining part 10 results for the subsequent electrical welding to the second component 30. In this context it is particularly preferred if the following conditions are met: 0.8 mm≤SR₃<1.2 mm, SW=55° and MR₃=30 mm.

It is also preferred to equip the die 50 according to the above-described alternatives with a recess 52 similarly deep but formed elliptically.

Certain embodiments or components or features of components have been noted herein as being "preferred" and such indications are to be understood as relating to a preference of the applicant at the time this application was filed. Such embodiments, components or features noted as being "preferred" are not required for implementation of the inventions disclosed herein unless otherwise indicated as being required, or unless specifically included within the claims that follow.

The invention claimed is:

1. A connection method for a welding auxiliary joining part with a head and a rounded tip for setting in at least one first component of a poorly weldable material with a die as a counter-bearing having a concave recess with a cone-shaped inner wall in at least a partial portion with a die radius MR in a range of 1.0 mm≤MR≤60 mm for preparing a subsequent welding method with the connection method comprising the steps of:
setting the welding auxiliary joining part in the at least one first component of the poorly weldable material and against the die, wherein there is a material displacement gap provided between a tip portion of the welding auxiliary joining part and the die geometry into which the poorly weldable material of the at least one first component is capable of being removed radially outwardly, and
deforming the tip portion of the welding auxiliary joining part directly at the die, while the following conditions are fulfilled:

$$0.001 \leq \frac{SR}{MR} \leq 0.1,$$

wherein SR denotes a tip radius of the rounded tip of the welding auxiliary joining part.

2. The connection method according to claim 1, wherein the tip radius SR and the die radius MR show the following ratio: MR≥2·SR.

3. The connection method according to claim 1, wherein the die radius MR is selected from the range 20 mm≤MR≤40 mm and the tip radius SR is selected from the range 0.1 mm≤SR≤1.5 mm.

4. The connection method according to claim 1, wherein the welding auxiliary joining part has a cone-shaped portion, which is positioned between the rounded tip and the head, which widens towards the head and which comprises a tip angle SW between a center axis of the cone-shaped portion and a lateral cone surface in the range of 35°≤SW≤80°.

5. The connection method according to claim 1, in which the welding auxiliary joining part is accelerated while setting to a speed in the range of 1 m/s≤v≤40 m/s, and/or comprising the further step of:
welding the first component having the welding auxiliary joining part to a second component made of weldable material.

6. A connection method for a welding auxiliary joining part with a head and a rounded tip for setting in at least one first component of a poorly weldable material with a die as a counter-bearing having a concave recess with an arc-shaped inner wall at least in a partial portion thereof, wherein said die has a die radius MR in a range of 1.0 mm≤MR≤60 mm for preparing a subsequent welding method, wherein the connection method comprises the steps of:
setting the welding auxiliary joining part in the at least one first component of the poorly weldable material and against the die, wherein there is a material displacement gap provided between a tip portion of the welding auxiliary joining part and the die into which the poorly weldable material of the at least one first component is capable of being removed radially outwardly, and
deforming the tip portion of the welding auxiliary joining part directly at the die, while the following conditions are fulfilled:

$$0.01 \leq \frac{SR}{MR} \leq 1,$$

wherein SR denotes a tip radius of the rounded tip of the welding auxiliary joining part.

7. The connection method according to claim 6, wherein the die has a concave recess with the die radius MR in the range of 1.5 mm≤MR≤5 mm, wherein the arc-shaped recess having an at least partial arc-shaped inner wall opens in a circumferential convex region, in particular with an outer die radius in the range of 15 mm≤MR$_a$≤40 mm.

8. The connection method according to claim 6, wherein the tip radius SR and the die radius MR show the following ratio: MR≥2·SR.

9. The connection method according to claim 6, wherein the die radius MR comprises the range of 1.5 mm≤MR≤5 mm and the tip radius SR comprises the range of 0.1 mm≤SR≤1.5 mm.

10. The connection method according to claim 6, wherein the welding auxiliary joining part has a cone-shaped portion which is positioned between the rounded tip and the head, which opens towards the head and which comprises a tip angle SW between a center axis of the cone-shaped portion and a lateral conical surface in the range of 35°≤SW≤80°.

11. The connection method according to claim 6, in which the welding auxiliary joining part is accelerated while setting to a speed in the range of 1 m/s≤v≤40 m/s, and/or comprising the further step of:
welding the first component having the welding auxiliary joining part to a second component made of weldable material.

12. A connection method for a welding auxiliary joining part with a head and a rounded tip for setting in at least one first component of a poorly weldable material with a die as a counter-bearing comprising a concave recess with an inner wall arc-shaped in at least a partial portion with a die radius MR in a range of 1.0 mm≤MR≤60 mm, for preparing a subsequent welding method, wherein the connection method comprises the steps of:
setting the welding auxiliary joining part in the at least one first component of the poorly weldable material and against the die, wherein there is a material displacement gap provided between a tip portion of the welding auxiliary joining part and the die into which the poorly weldable material of the at least one first component is capable of being removed radially outwardly, and deforming the tip portion of the welding auxiliary joining part directly at the die, while the following conditions are fulfilled:

$$0.01 \leq \frac{SR}{MR} \leq 0.5,$$

wherein SR denotes a tip radius of the rounded tip of the welding auxiliary joining part.

13. The connection method according to claim 12, wherein the tip radius SR and the die radius MR show the following ratio: MR≥2·SR.

14. The connection method according to claim 12 wherein the die radius MR comprises the range of 20 mm≤MR≤40 mm and the tip radius SR comprises the range of 1 mm≤SR≤1.5 mm.

15. The connection method according to claim 12, in which the welding auxiliary joining part is accelerated while setting to a speed in the range of 1 m/s≤v≤40 m/s, and/or comprising the further step of:
    welding the first component having the welding auxiliary joining part to a second component made of weldable material.

16. A connection method for a welding auxiliary joining part with a head and a tip for setting in at least a first component of a poorly weldable material with a die as a counter-bearing, which has a recess with a die angle MW between a central axis of the recess and an inner wall of the recess, for preparing a subsequent welding method, the connection method comprising the steps of:
    setting the welding auxiliary joining part in the at least one first component of the poorly weldable material and against the die, wherein there is a material displacement gap provided between the welding auxiliary joining part and the die into which the poorly weldable material of the at least one first component is capable of being removed radially outwardly, and
    deforming the tip portion of the welding auxiliary joining part at the die, while the following conditions are fulfilled:

$$0.4 \leq \frac{SR}{MR} \leq 1.0,$$

wherein SW denotes a tip radius of the tip of the welding auxiliary joining part measured between the central axis and a outer surface of the welding auxiliary joining part.

17. The connection method according to claim 16, wherein the die has an angled recess with the die angle MW in the range of 70°≤MW≤90°.

18. The connection method according to claim 16, wherein the tip angle SW and the die angle MW show the following ratio: MW−SW≥10°.

19. The connection method according to claim 16, wherein the tip angle SW comprises a range of 35°≤SW≤80°.

20. The connection method according to claim 16, wherein the welding auxiliary joining part has a conical region, which is positioned between the tip and the head and which expands towards the head, and the conical portion having the tip angle SW between the central axis and a lateral conical surface.

21. The connection method according to claim 16, in which the welding auxiliary joining part is accelerated while setting to a speed in the range of 1 m/s≤v≤40 m/s, and/or comprising the further step of:
    welding the first component having the welding auxiliary joining part to a second component made of weldable material.

\* \* \* \* \*